United States Patent
Yumoto et al.

(12) 
(10) Patent No.: US 6,778,661 B1
(45) Date of Patent: Aug. 17, 2004

(54) MULTIMEDIA CALL DISTRIBUTION SYSTEM

(75) Inventors: Kazuma Yumoto, Yokohama (JP); Yoshiyuki Nakayama, Kawasaki (JP)

(73) Assignee: Hitachi, Ltd. (JP)

( * ) Notice: Subject to any disclaimer, the term of this patent is extended or adjusted under 35 U.S.C. 154(b) by 0 days.

(21) Appl. No.: 09/510,065

(22) Filed: Feb. 22, 2000

(30) Foreign Application Priority Data

Feb. 23, 1999 (JP) ............................................. 11-044866

(51) Int. Cl.[7] ........................ H04M 3/42; H04M 3/523; H04L 12/16; H04L 12/66; H04Q 11/00
(52) U.S. Cl. .................. 379/265.09; 370/270; 370/352; 379/900; 379/908
(58) Field of Search ................................ 370/270, 352, 370/389, 401; 379/265.01, 265.02, 265.09, 900, 908

(56) References Cited

U.S. PATENT DOCUMENTS

| | | | |
|---|---|---|---|
| 4,837,798 A | | 6/1989 | Cohen et al. ............. 379/88.14 |
| 5,193,110 A | * | 3/1993 | Jones et al. .............. 379/93.14 |
| 5,195,086 A | | 3/1993 | Baumgartner et al. ...... 370/264 |
| 5,572,585 A | * | 11/1996 | Tsutsui ........................ 379/242 |
| 6,046,762 A | * | 4/2000 | Sonesh et al. ............ 348/14.11 |
| 6,449,260 B1 | * | 9/2002 | Sassin et al. ................ 370/270 |
| 6,577,605 B1 | * | 6/2003 | Dagate et al. .............. 370/270 |

* cited by examiner

Primary Examiner—Harry S. Hong
(74) Attorney, Agent, or Firm—Sofer & Haroun, LLP

(57) ABSTRACT

The multimedia call distribution system maintains call connection devices, a multimedia call distribution device, and terminal devices. When a call connection request is received, each of the call connection devices issues an inquiry to the multimedia call distribution device about a terminal device to which a call is to be connected. The call connection device connects the call to the terminal device as a response to the inquiry by the multimedia call distribution device The multimedia call distribution device monitors communication conditions of each terminal device about respective types of media, and selects one terminal device that can preform real-time communication and informs the call connection device that has issued the inquiry of the selected device as a response, when the inquiry is received from the call connection device, and when a type of media of the call connected by the call connection device that has issued the inquiry is a type of media that preform real-time communication.

18 Claims, 14 Drawing Sheets

FIG. 9

| MEDIA TYPE (150) | REQUEST CONTENTS SHOULD BE ANALYZED (○) OR NOT (×) (155) |
|---|---|
| TEL | ○ |
| FAX | × |
| IP TEL | × |
| MAIL (UNIFIED MESSAGE) | ○ |
| CSCW | × |
| Web CONVERSATION | ○ |
| ⋮ | ⋮ |

FIG. 10

| ID | OPERATOR/ NAME OF PERSON IN CHARGE | TEL | FAX | MAIL (UNIFIED MESSAGE) | CSCW | INTERNET TELEPHONY |
|---|---|---|---|---|---|---|
| ... | ... | ... | ... | ... | ... | ... |
| 008 | HHH HHH | 4544 | 4949 | hhh | 133.144.xxx.hhh | 133.144.xxx.hhh |
| ... | ... | ... | ... | ... | ... | ... |
| 034 | NNN NNN | 4644 | — | — | 133.144.xxx.nnn | — |
| ... | ... | ... | ... | ... | ... | ... |
| 098 | YYY YYY | 4608 | 4979 | yyy | — | — |
| ... | ... | ... | ... | ... | ... | ... |

| ID | OPERATOR/ NAME OF PERSON IN CHARGE | TEL | FAX | MAIL | CSCW | INTERNET TELEPHONY |
|---|---|---|---|---|---|---|
| ... | ... | ... | ... | ... | ... | ... |
| 008 | HHH HHH | 1 | 0 | 0 | 0 | 0 |
| ... | ... | ... | ... | ... | ... | ... |
| 034 | NNN NNN | 1 | — | — | 1 | 0 |
| ... | ... | ... | ... | ... | ... | ... |
| 098 | YYY YYY | 0 | 0 | 0 | — | — |
| ... | ... | ... | ... | ... | ... | ... |

FIG. 12

| MEDIA TYPE (170) | RESPONSES CORRESPONDING TO CONTENTS OF CUSTOMER'S REQUEST (172) | | RESPONSES TO BE MADE WHEN THERE IS NO FREE OPERATOR/ NO FREE PERSON IN CHARGE (176) |
|---|---|---|---|
| | IMMEDIACY IS REQUIRED (173) | DETAILED EXPLANATION IS REQUIRED (174) | |
| TEL | — | IF FACSIMILE IS AVAILABLE, SEND REFERENTIAL DOCUMENT VIA FACSIMILE | VOICE MAIL (MEDIA CONVERSION) |
| FAX | SEND INFORMATION MESSAGE | SEND REFERENTIAL DOCUMENT VIA FACSIMILE + EXPLANATION BY TELEPHONE | FAX MAIL (MEDIA CONVERSION) |
| IP TEL | — | IF A BROWSER IS AVAILABLE, HAVE A Web CONVERSATION | VOICE MAIL (MEDIA CONVERSION) |
| MAIL (UNIFIED MESSAGE) | SEND INFORMATION MESSAGE | RETURN E-MAIL + EXPLANATION BY TELEPHONE | — |
| CSCW | — | — | TEL (+ FAX) (REQUEST OF MEDIA CHANGE) |
| WEB CONVERSATION | — | — | TEL (REQUEST OF MEDIA CHANGE) |
| ... | ... | ... | ... |

MULTIMEDIA CALL DISTRIBUTION SYSTEM

BACKGROUND OF THE INVENTION

1. Field of the Invention

The present invention relates to a technique of call distribution in a CTI (Computer Telephony Integration) system typified by a call center or help desk, and, in particular, to a technique of call distribution using plural types of media.

2. Related Art Statement

As a conventional technique of call distribution in a CTI system, there is known ACD (Automatic Call Distribution), which has been used in a telephone system. In this technique, a call that arrives at a PBX (private branch exchange) from a customer is connected to an extension to an operator who is free among the operators whose extensions are connected to that private branch exchange.

Recently, according to developments in electronics, it has become possible to use various media for communication, such as E-mail, Internet telephony, and computer supported cooperative work (CSCW), in addition to conventional media such as telephone and facsimile. Accordingly, it is to be desired that a CTI system be also adapted for those various media.

In order to adapt a CTI system for various media, it is desirable that a same operator can use various types of media in order to have conversation with customers, not that each operator is assigned to one type of media. For example, it is to be desired that each operator be provided with both a telephone and a computer for CSCW so that the operator uses the telephone to have a telephone conversation with a customer and uses the computer to have a conversation with a customer in CSCW. However, when the above-mentioned ACD as it stands is applied to a CTI system, ACD takes only telephone calls into consideration to distribute those telephone calls. Thus, it sometimes happen that plural types of media, which carry out real-time communication, distribute communications to one operator, who, however, can not deal with a plurality of communications at the same time. For example, a telephone call may be distributed to a telephone of an operator who is already involved in an electronic conversation with a customer whose call has been received in CSCW.

When a call connection request from a customer arises, and there does not exist an operator who can deal with the call through the medium of that request, then, no response will be made to that call.

SUMMARY OF THE INVENTION

An object of the present invention is to provide a CTI system that can deal with plural types of media and can properly distribute calls among operators.

Another object of the present invention is to make it possible to respond to a call connection request from a customer without spoiling service quality, even if there does not exist an operator who can respond to that call through the medium of that request, when that request arises in a CTI system adapted for various media.

To achieve those objects, the present invention provides a multimedia call distribution system comprising a plurality of call connection devices that connect calls of respective types of media different from one another, a multimedia call distribution device, and a plurality of terminal devices that can perform communication by calls of plural different types of media.

Each of the call connection devices comprises an inquiry means for inquiring the multimedia call distribution device about a terminal device to which a call is to be connected, when a call connection request is received, and a connection means for connecting the call to the terminal device informed as a response to said inquiry, by the multimedia call distribution device.

The multimedia call distribution device comprises monitoring means for monitoring communication conditions of each terminal device about respective types of media, and connection destination deciding means for selecting one terminal device that performs real-time communication and is not involved in communication, when an inquiry is received from the call connection device about a terminal device to which a call of real-time communication is connected, the connection destination deciding means informing the call connection device that has issued the inquiry, of the selected device as a response to said inquiry.

According to the present invention, for each operator's terminal device, communication conditions of calls of all the type of media for which CTI system is adapted are supervised, to decide an operator's terminal to which a call from a customer is to be connected, based on those communication conditions. As a result, it is prevented that a plurality of calls performing real-time communication at the same time is assigned to the same operator.

The present invention also provides media conversion means. When there does not exist a terminal device that can be selected, the media conversion means connects to the call for which the inquiry has issued to receive the contents of the communication, and converts the received communication contents into a call of a different type of media. As a result, even when there does not exist an operator who can connect a call of the customer, it is possible to provide high quality response for customers, for example by performing media conversion to receive a customer's request as mail, or requesting a customer to change a media type used for contact.

BRIEF DESCRIPTION OF THE DRAWINGS

The present invention will be more apparent from the following detailed description when taken in conjunction with the accompanying drawings, in which:

FIG. 9 shows an environment setting table according to an embodiment of the present invention;

FIG. 10 shows an operator information table according to an embodiment of the present invention;

FIG. 11 shows a connection management table according to an embodiment of the present invention;

FIG. 12 shows a rule table according to an embodiment of the present invention;

DETAILED DESCRIPTION

Figure 1:
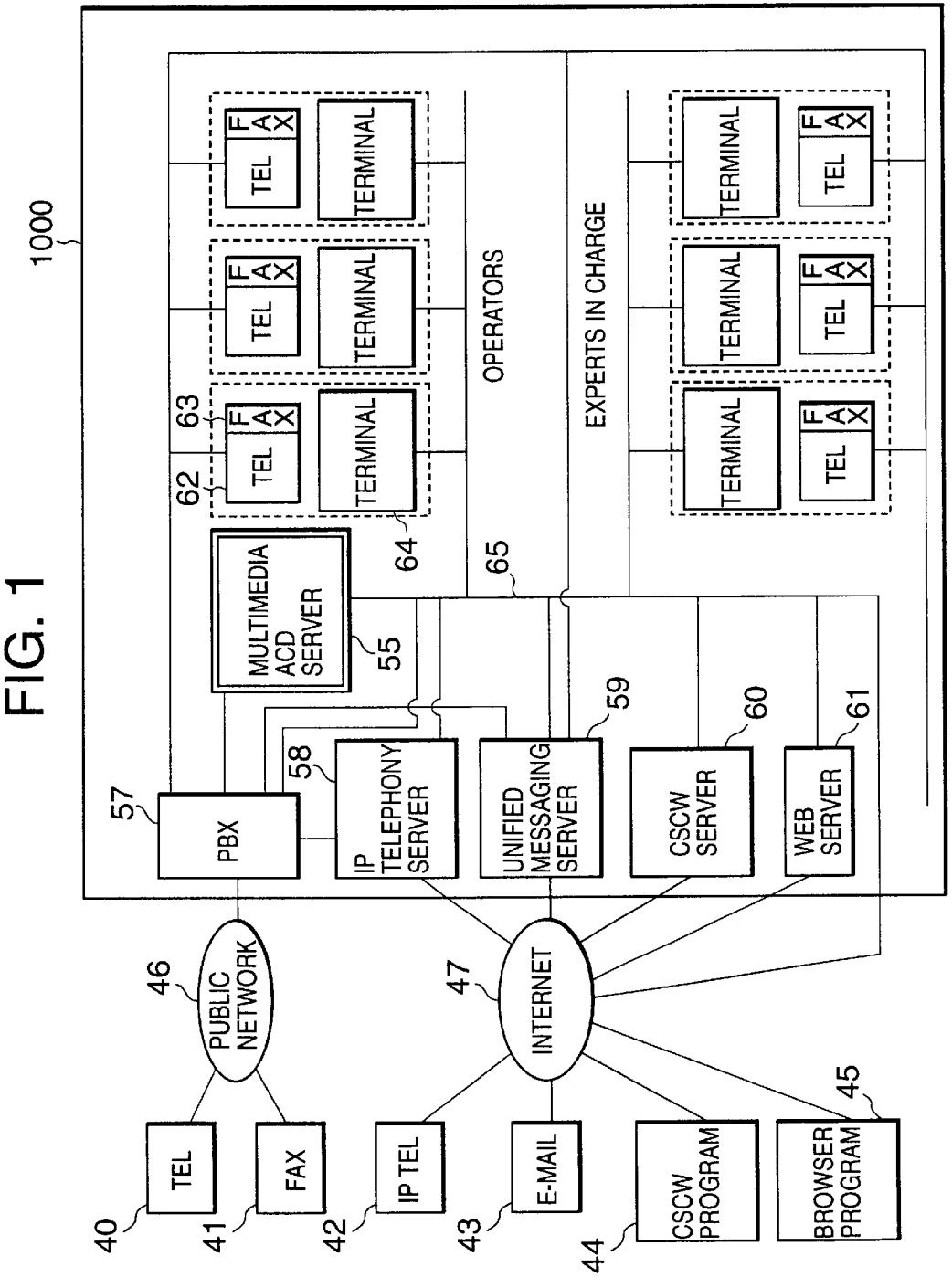
FIG. 1 is a block diagram showing a configuration of a CTI system according to an embodiment of the present invention.

In FIG. 1, a reference numeral 1000 refers to a CTI system, and each operator is provided with a telephone 62, a facsimile 63, and a computer (terminal) 64. Each computer terminal 64 runs: a unified message processing program for a user to process various messages such as E-mail, voice-mail, and FAX mail in a unified manner; a CSCW program for carrying out CSCW, which means a conversation on a whiteboard or in a state of sharing an application, utilizing telepointing (pointing stick) and telewriting (drawing); and a WEB program for carrying out a WEB conversation.

The CTI system 1000 comprises: a PBX 57 that controls connection of telephone and facsimile calls, an IP telephony server 58 that controls connection of Internet telephony calls, a unified messaging server 59 that controls connection of calls of various messages such as E-mail, voice mail, and Fax mail, a CSCW server 60 that controls connection of calls of electronic conversation media such as an electronic blackboard and the like, a WEB server 61 that opens WEB pages to the public on Internet 47 and controls connection of calls of WEB conversations, and a multimedia ACD server 55, those PBX and servers being connected with one another through LAN 65.

In the figure, a telephone 40 and a facsimile 41 are connected to the CTI system 1000 through a public network 46, and an Internet telephony program 42, an E-mail program 43, a CSCW program 44 and a WEB browser program 45 that run on a computer used by a customer are connected to the CTI system 1000 through Internet.

A connection request from a customer arises concerning a call of a certain type of media whose connection is controlled by one of the PBX 57, the unified messaging server 59, the CSCW server 60, the IP telephony server 58 and the WEB server 61. Then, the PBX or a server in charge of that type of media inquires of the multimedia ACD server 55 about an operator of a connection destination of the call and connects the customer's call to the operator replied from the multimedia ACD server 55. When the call can not be connected since the operator of the destination is busy or by another reason, then the multimedia ACD server 55 causes the PBX 57, the IP telephony server 58 or the like to perform media conversion to convert the communication media through the unified messaging server 59. For example, telephone voice is converted to voice mail and sent to an operator.

In the PBX 57, a call connection request from a customer arises when there is an incoming call from a customer's telephone 40 or facsimile 41 through the public network 46, or when a customer's telephone connection request, which is issued by a customer's browser program 45, is informed from the WEB server 61. When there arises an incoming call from a customer's telephone 40 or facsimile 41, the PBX 57 connects that call to a telephone 62 and facsimile 63 of an operator (in this case, operator's extension telephone number) replied from the multimedia ACD server 55. On the other hand, when a customer's telephone connection request is informed from the WEB server 61, then, the PBX 57 performs control operations to connect the call between the customer and the telephone 62 of the operator replied from the multimedia ACD server 55. For example, the PBX 57 calls the telephone 62 of the operator replied from the ACD server 55, to establish a telephone line between the PBX 57 and the operator's telephone 62. Then, the PBX 57 calls the customer's telephone 40 to establish a telephone line between the PBX 57 and the customer's telephone 40. Thereafter, those telephone lines are connected with each other.

In either case, when media conversion into voice mail or Fax mail is instructed by the ACD server 55, the PBX 57 performs control operations to connect a call between a customer's telephone 40 or facsimile 41 and the unified messaging server 59. This is realized when the object of the call connection with the customer's telephone is the unified messaging server 59, instead of the operator's telephone in the above process.

In the IP telephony server 58, a call connection request from a customer arises when the IP telephony server 58 receives an incoming call from a customer's Internet telephone 42 through the Internet 47, or when a customer's Internet telephony connection request, which is issued by a customer's browser program 45, is informed from the WEB server 61. When there arises an incoming call from the customer's Internet telephone 42, the IP telephony server 58 connects that call to an Internet telephony program of a computer of an operator (in this case, an IP address of the operator's computer) replied from the multimedia ACD server 55. On the other hand, when a customer's Internet telephony connection request is informed from the WEB server 61, the IP telephony server 58 informs the customer's browser program 45 of the IP address of the customer's computer replied from the multimedia ACD server 55. Being informed of the IP address, the customer's browser program 45 starts up the Internet telephony program 42 of the customer and delivers the informed IP address to that program. The started Internet telephony program 42 connects a call to the IP address delivered. This call addressed to the IP address of the operator's computer is directly connected to the Internet telephony program of the operator's computer. Conversely, when the customer's Internet telephony connection request is informed from the WEB server 61, the Internet telephony program of the operator's computer, which is replied from the multimedia ACD server 55, is informed of an IP address of the customer's computer by the IP telephony server 58. Being informed of that IP address, the Internet telephony program of the operator connects the call to the informed IP address. The call addressed to the IP address of the customer's computer is directly connected to the Internet telephony program of the customer's computer.

In either case, when media conversion into voice mail is instructed by the ACD server 55, the IP telephony server 58 performs control operations to connect a call between the customer's Internet telephone 42 and the unified messaging server 59. This is realized when the object of the call connection with the customer's Internet telephone is the unified messaging server 59, instead of the Internet telephony program of the operator's computer.

In the CSCW server 60, a call connection request from a customer arises when the CSCW server 60 receives an incoming call from a customer's CSCW program 44 through the Internet 47. When there arises an incoming call from a customer's CSCW program 44, the CSCW server 60 connects that call to the CSCW program of the operator (in this case, an IP address of the operator's computer) replied from the multimedia ACD server 55.

The unified messaging server 59 performs media conversion on voice or facsimile received through a call connected by the PBX 57 or the IP telephony server 58 into voice mail or Fax mail. In the unified messaging server 59, a call connection request from a customer arises when the unified messaging server 59 receives E-mail from a customer's E-mail program 43 through Internet 47, or when voice mail or Fax mail is generated as a result of the media conversion. The received E-mail, or voice mail or Fax mail as a result of the media conversion is delivered to the unified message processing program of the operator (in this case, a mail address of the operator) replied from the multimedia ACD server 55.

In the WEB server 61, a call connection request from a customer arises when the WEB server 61 receives a WEB conversation request from a customer's browser program 45 through Internet 47. When a WEB conversation request is received, the WEB server 61 connects the customer's browser program 45 and a WEB conversation program of the computer of the operator (in this case, an IP address of the operator's computer) replied from the multimedia ACD server 55.

The above-mentioned connection request for the telephone or Internet telephone from the customer's browser program 45 is issued to the WEB server 61 as follows.

Figure 2:
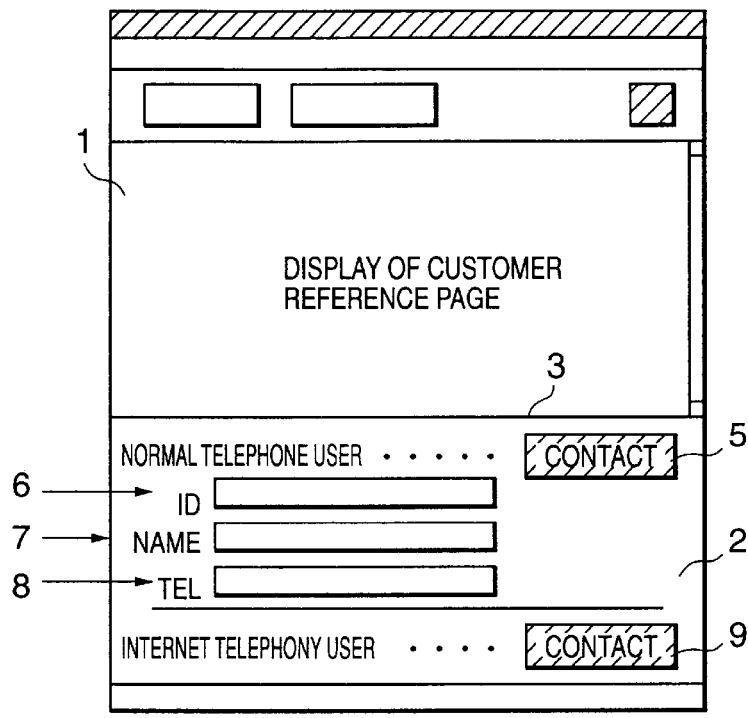
FIG. 2 is a view showing an example of a screen of a WEB page according to an embodiment of the present invention.

The WEB server 61 opens a WEB page, for example, shown in FIG. 2 to the public on Internet 47.

This WEB page displays a screen 1 showing information to be seen by a customer and a form screen 2 for issuing a contact request, those screens 1, 2 being separated by a frame 3.

When a customer who browses this WEB page using the browser program 45 wishes to make contact with the issuer of the WEB page, the customer fills in required items in the form screen 2 and issues a contact request. For example, to request contact using a telephone 40, the customer inputs his customer ID 6 (in the case that the customer ID has been already obtained), name 7 and telephone number 8, and pushes a contact request button 5 for a telephone. On the other hand, to request contact using an Internet telephone 42, he pushes a contact request button 9 for an Internet telephone.

These requests are sent to the WEB server 61 together with the contents inputted into the form screen 2. When the contact request button 5 for a telephone has been pushed, a call connection request accompanied by the customers telephone number is sent from the WEB server 61 to the PBX 57. When the contact request button 9 for an Internet telephone has been pushed, a call connection request accompanied by the IP address of the customer's computer obtained by the WEB server 61 is sent from the WEB server 61 to the IP telephony server 58.

Figure 3:
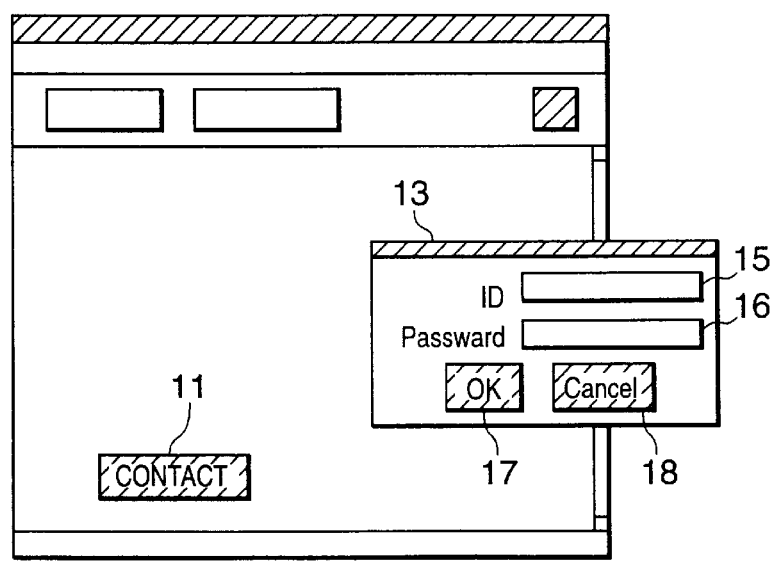
FIG. 3 is a view showing an example of a screen of a WEB page according to an embodiment of the present invention.

Or, a database for managing customer information (name, designation of telephone or Internet telephone to be used for contact, telephone number, customer ID, password) and the like may be provided to be managed by the WEB server 61, and a WEB page such as shown in FIG. 3 may be used instead of the WEB page shown in FIG. 2.

In the WEB page shown in FIG. 3, when a customer requests contact, he pushes a contact request button 11. When the contact request button 11 is pushed, the WEB server displays a screen 13 for a user authentication. In the screen 13, the customer inputs his customer ID 15 and password 16, and pushes an OK button 17. When the OK button 17 is pushed, the WEB server 61 receives the inputted contents, searches the database with respect to the customer ID to verify the password, and obtains information on which of a telephone or Internet telephone is used by this customer to make contact. In a case where this customer is to use a telephone to make contact, the telephone number of the customer is obtained. Thereafter, operations are similar to the case of FIG. 2.

With respect to the multimedia ACD server 55 in thus-described CTI system, in the following there will be described operations for deciding a connection destination operator in response to inquiry from the PBX 57, the unified messaging server 59, the CSCW server 60, the IP telephony server 58, or the WEB server 61 about an operator of a connection destination for a call. Further, there will be described operations for deciding what media conversion is to be performed when a call can not be connected, since an operator of the connection destination is busy, for example.

First, there will be described configuration and operations for the PBX 57, the unified messaging server 59, the CSCW server 60, the IP telephony server 58 or the WEB server 61 to inquire of the multimedia ACD server 55 as to a connection destination for a call.

Figure 4:
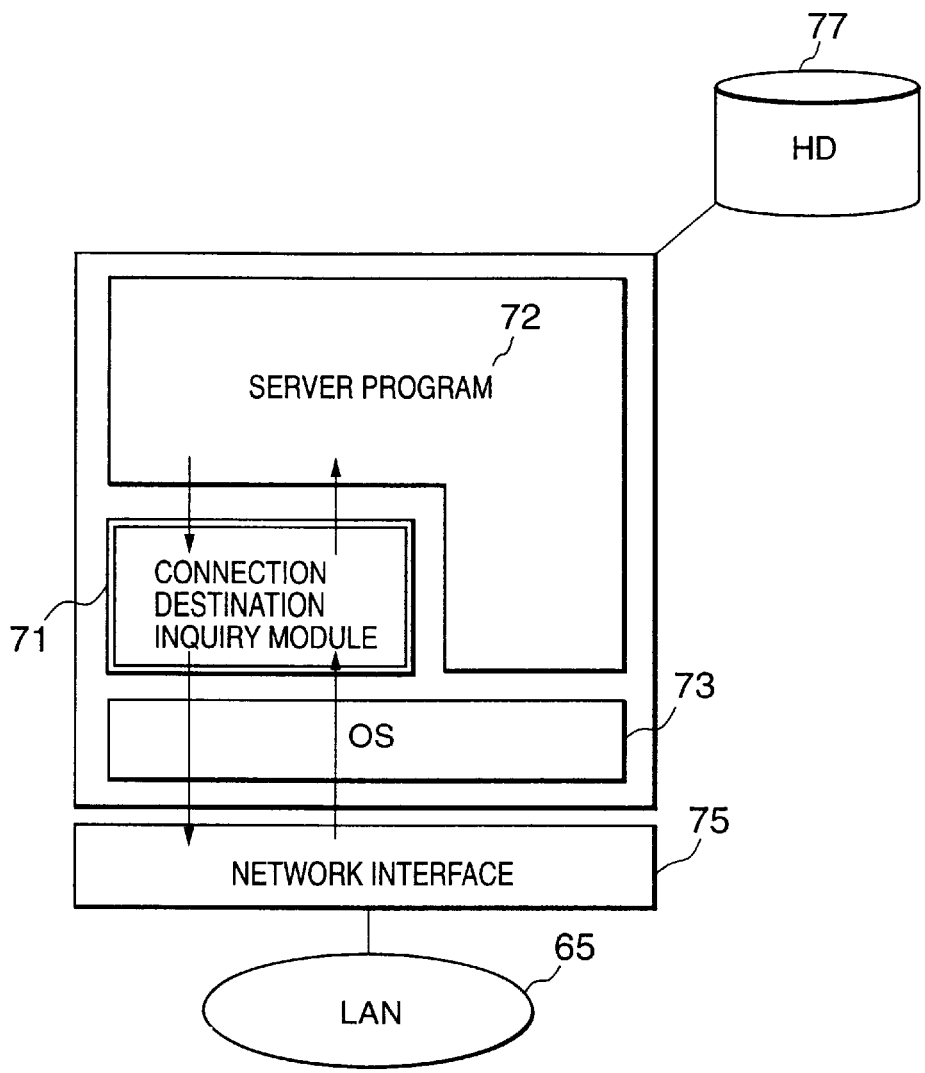
FIG. 4 is a block diagram showing a configuration of a unified messaging server 59, a CSCW (computer supported cooperative work) server 60, an IP telephony server 58 and a WEB server 61 that are responsible for connection of a call in FIG. 1.

From the viewpoint of hardware, each of these servers shown in FIG. 4 is a computer of general structure having a CPU, a main memory, and various input/output devices.

On the other hand, from the functional viewpoint, as shown in the figure, a connection destination inquiry module 71 is added to a server program 72 that realizes an each server's conventional function on OS 73.

When there arises a call connection request as described above, then the server program 72 informs the connection destination inquiry module 71 about it.

Figure 5:
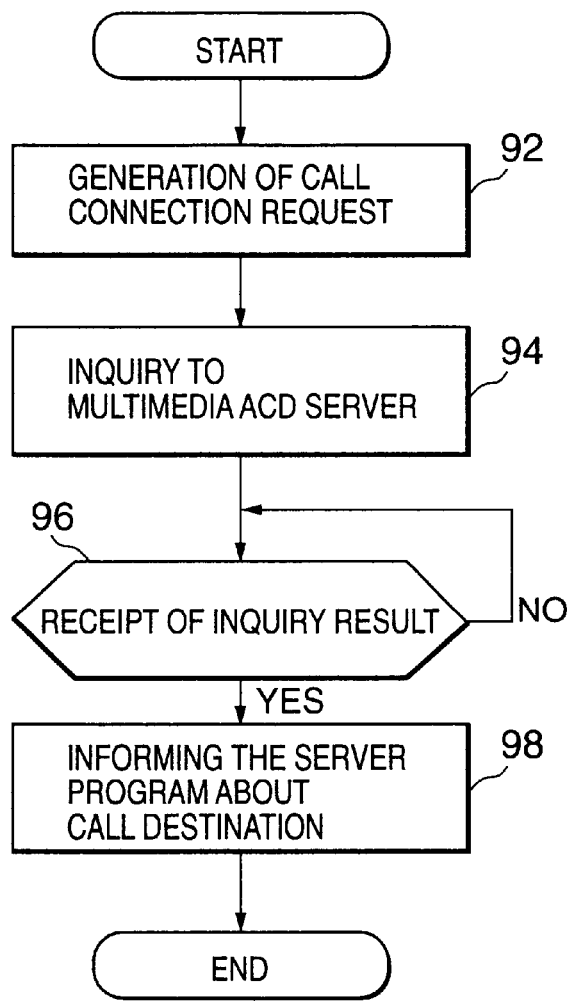
FIG. 5 is a flowchart showing a process carried out by a connection destination inquiry module according to an embodiment of the present invention.

As shown in FIG. 5, when the connection destination inquiry module 71 is informed by the server program 72 about the generation of the call connection request (Step 92), then, the connection destination inquiry module 71 issues an inquiry about the connection destination to the multimedia ACD server 55 through a LAN network interface 75 (Step 94). On receiving a result replied from the multimedia ACD server 55 (Step 96), the connection destination inquiry module 71 informs the server program 72 about it (Step 98).

Depending on the contents of the reply, the server program 72 controls connection of the call as described above.

A configuration of the PBX 57 is almost similar to one shown in FIG. 5. except that it has a functional part for circuit switching instead of the server program 72. The WEB server 61 has, in addition, a functional part for informing another server of a call connection request, depending on the contents of input from a customer's browser, as described above.

In the PBX 57 or each server, the connection destination inquiry module 71 can be a program stored in a HD 77 or the like provided to the PBX 57 or the server, to be executed by a CPU of the PBX 57 or the server. That program may be either a resident program that is executed in relation to activation/termination of the terminal, or a program of such a type that it is started up when generation of a call connection request is informed and ended when the processing is ended.

Figure 6:
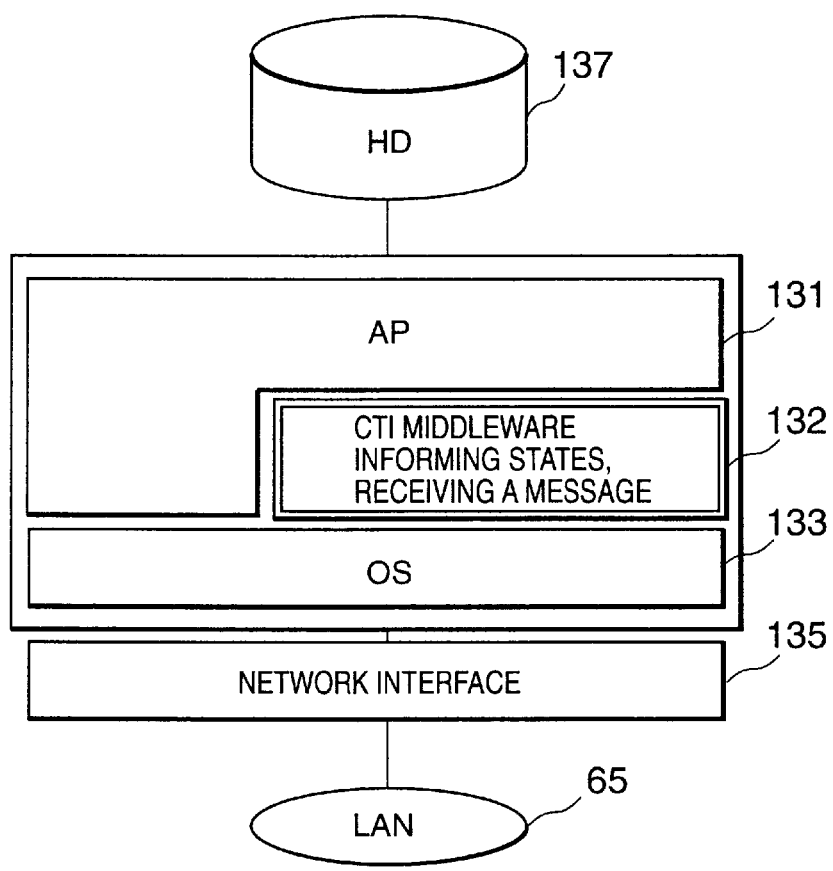
FIG. 6 is a block diagram showing a configuration of a computer provided to each operator in an embodiment of the present invention.

As shown in FIG. 6, a computer 64 is provided with OS 133, applications 131 such as the above-mentioned CSCW program, unified message processing program, Internet telephony program, etc., and CTI middleware 132.

Figure 7:
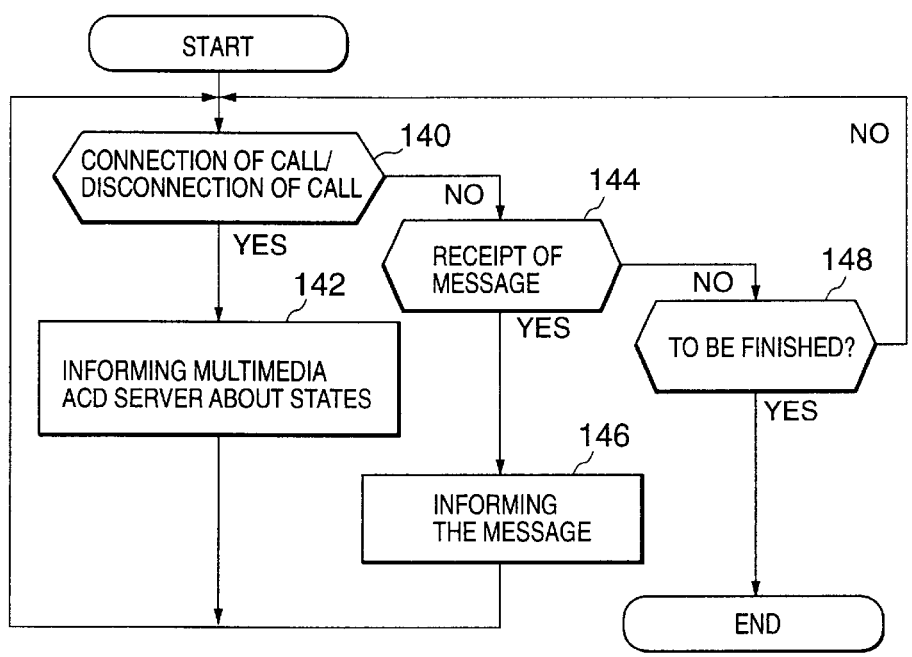
FIG. 7 is a flowchart showing a process carried out by CTI middleware according to an embodiment of the present invention.

As shown in FIG. 7, the CTI middleware 132 detects a state change concerning a call of each media, such as connection of a call or disconnection of a call (Step 140), and informs the multimedia ACD server 55 of the state change through a LAN network interface 135 (Step 142). When a message is received from the multimedia ACD server 55 or the like through the LAN network interface 135 (Step 144), the CTI middleware 132 informs the operator of the received message, by displaying the message on the screen of the terminal (Step 146).

The detection of the state change concerning a call of each media such as connection of a call or disconnection of a call is carried out, for example in the case of a telephone, by connecting a telephone 62 and a computer 64, and based on contents notified from the telephone through TAPI (Telephony API), JTAPI (Java Telephony API) etc. In the case of CSCW, the detection is carried out by obtaining a call connection/call disconnection notice from the CSCW program.

Similarly to OS 133 and the application program 131, the CTI middleware 132 is stored in a hard disk 137 and, at the time of operation, read into the memory to be executed by the CPU of the computer 64. The CTI middleware 132 operates as a resident program.

Figure 8:
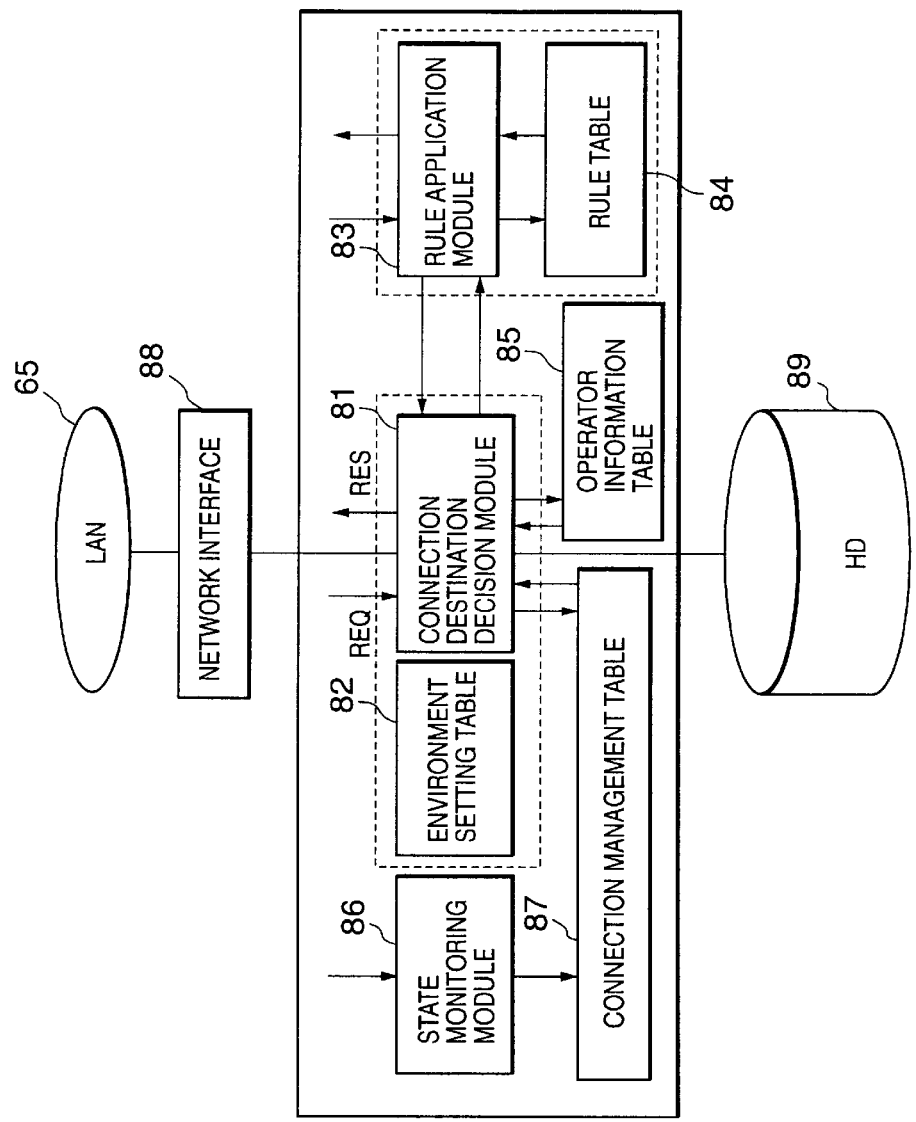
FIG. 8 is a block diagram showing a configuration of a multimedia ACD server according to an embodiment of the present invention.

From the viewpoint of hardware, as shown in FIG. 8, the multimedia ACD server 55 is a computer of general structure having a CPU, a main memory, and various input/output devices.

From the functional viewpoint, the multimedia ACD server 55 is connected with the LAN 65 through a LAN network interface 88, and provided with a connection destination decision module 81, a rule application module 83, a state monitoring module 86, an environment setting table 82, a rule table 84, an operator information table 85, and a connection management table 87.

The connection destination decision module 81, the rule application module 83, and the state monitoring module 86 are programs stored in a hard disk 89, and read into the memory as the need arises, to be executed by the CPU. The environment setting table 82, the rule table 84, the operator information table 85, and the connection management table 87 are stored in the hard disk 89.

As shown in FIG. 9, the environment setting table 82 stores setting 155 of whether analysis of contents of a customer's request should be performed or not, for each type of media 150. The analysis of the contents of a customer's request will be described below.

As shown in FIG. 10, the operator information table registers, for each operator 160, addresses (an extension telephone number, IP address, mail address, etc.) 165 of the operator used for calls of media types that the operator can utilize. Blank address means that the operator can not utilize a call of the media type corresponding to that blank.

As shown in FIG. 11, the connection management table 87 indicates, for each operator, a connection state of each media, "1" indicating a connected state and "0" indicating a disconnected state. The figure shows a case that the operator of ID 008 is now answering a customer on the telephone, and the operator of ID 034 is in visual communication with a customer using CSCW while has a conversation with him on the telephone. Further, it is shown that the operator of ID 098, whose fields of the usable media are all "0", is in a free state without answering a customer now.

As shown in FIG. 12, the rule table 84 registers, for each type of media 170, contents of media conversion 176 to be carried out when a call of that type of media can not be connected, and ways of answering 172 to be taken in accordance with contents of a customer's request.

Figure 13:
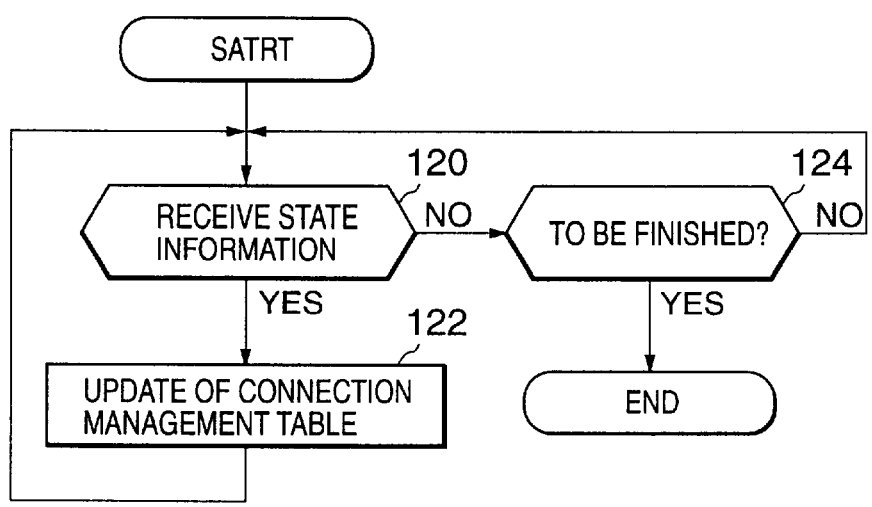
FIG. 13 is a flowchart showing a process carried out by a state monitoring module according to an embodiment of the present invention.

As shown in FIG. 13, when the state monitoring module 86 receives a notice of a state change from the above-mentioned CTI middleware 132 of an operator's computer 64 (Step 120), then, the state monitoring module 86 updates the contents of the connection management table 87 in accordance with the contents of the notice (Step 122). The state monitoring module 86 operates as a resident program.

Figure 14:
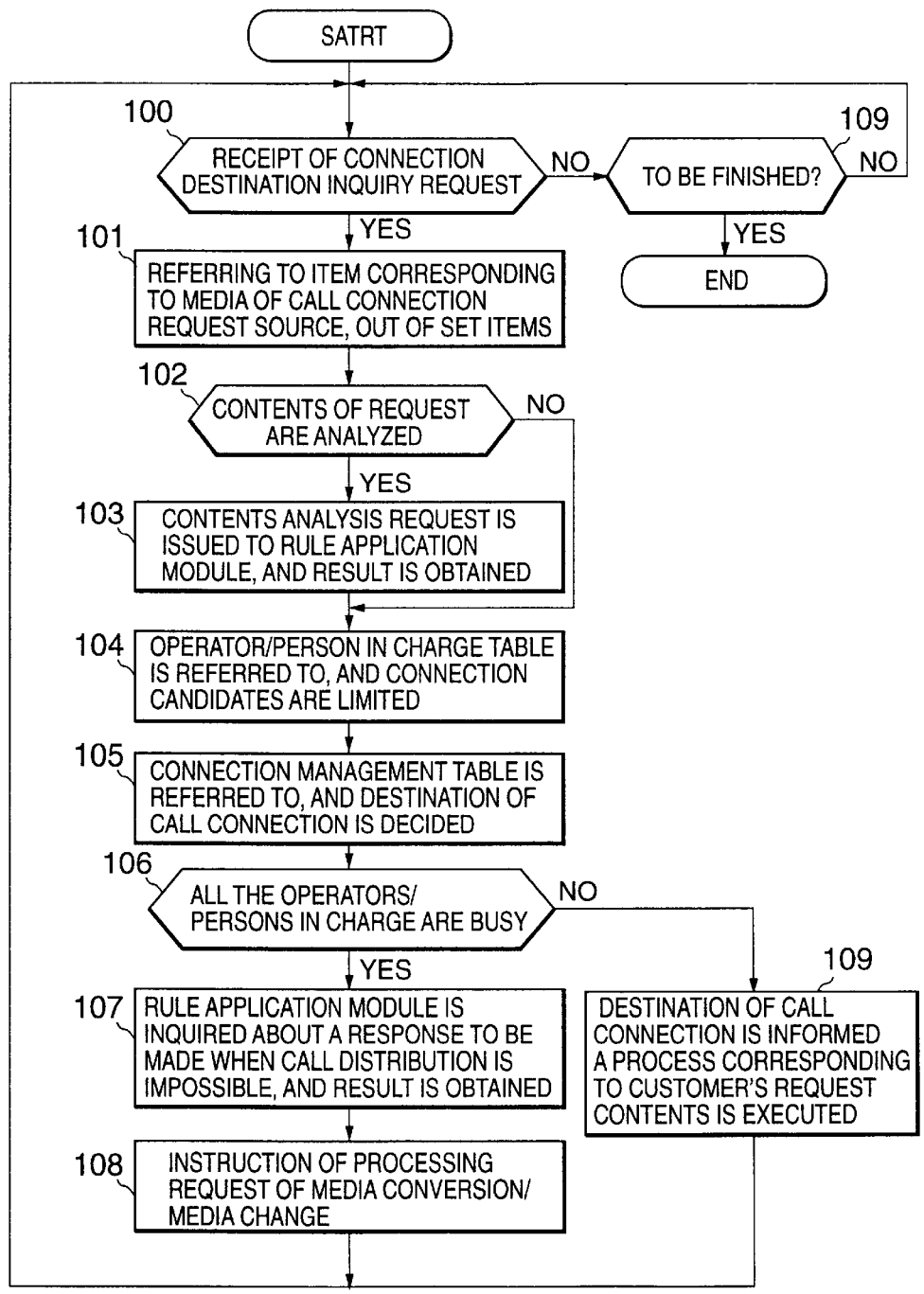
FIG. 14 is a flowchart showing a process carried out by a connection destination decision module according to an embodiment of the present invention.

As shown in FIG. 14, when the connection destination decision module 81 receives a connection destination inquiry request from the above-mentioned connection destination inquiry module 71 of the unified messaging server 59, the CSCW server 60, the IP telephony server 58, the WEB server 61, or the PBX 57 (Step 100), then, the connection destination decision module 81 investigates the setting corresponding to a media type of a call to be connected by the server or the PBX 57 that has issued the connection destination inquiry request, referring to the environment setting table 82 (Step 101).

When the content set in the environment setting table 82 shows that the contents of the customer's request should be analyzed (Step 102), then the connection destination decision module 81 inquires of the rule application module 83 about response corresponding to the contents of the customer's request, and obtains the result (Step 103).

The connection destination decision module 81 refers to the operator information table 85 in order to extract all operators who can respond to the media type of the call to be connected by the server or the PBX 57 that has issued the connection destination inquiry request (Step 104). At this time, when extracting operators, an address of the responding media type (in a case of responding via a telephone, an extension number of the responding operator; in a case of responding by e-mail, an e-mail address of the responding operator; and in a case of responding via an internet telephone or CSCW, an address of a terminal used by the responding operator) is extracted simultaneously with an operator ID and the name of the operator, as operator information.

When the media type of the call to be connected by the server or the PBX 57 that has issued the connection destination inquiry request is one that performs real-time communication such as the telephone, Internet telephone, and CSCW, then, the connection management table 87 is referred to, in order to assign any one of available operators (who is not in communication, that is, all his media to perform the real-time communication are in disconnected states, among the operators extracted in the step 104, as the destination of the call (Step 105).

On the other hand, when the media type of the call to be connected by the server or the PBX 57 is a type of media that perform non-real-time communication such as E-mail, voice mail, Fax, then, any one of the operators extracted in step 104 is assigned as the destination of the connection.

When there does not exist an operator to be assigned as the destination of the connection in the above processing, and thus the operator as the destination of the connection can not be decided in Step 105 (Step 106), then, the connection destination decision module 81 inquires of the rule application module 83 about a response to be made when the connection destination of the call does not exist, and obtain the result (Step 107). Being informed about the response to be made when the connection destination of the call does not exist, as a result of the inquiry to the rule application module 83, following process is carried out in Step 108. Namely, in Step 108, the connection destination decision module 81 sends the server or the PBX 57, which has issued the connection destination inquiry request, an instruction to process a request for media conversion or media change decided from that response.

On the other hand, when the operator as the connection destination can be decided in Step 105, then, the procedure proceeds to Step 109. In Step 109, the connection destination decision module 81 sends the decided operator's address of the media type corresponding to the call to be connected by the server or the PBX 57 that has issued the connection destination inquiry request, to that server or PBX 57. In the case that Step 103 has been carried out, then, Step 109 carries out the process decided from the response corresponding to the contents of the customer's request, that response being informed of in answer to the inquiry to the rule application module 83 in Step 103.

In a case where the connection destination of the call does not exist, as the response informed in answer to the inquiry to the rule application module 83 in Step 107, there is obtained designation of a resultant media type of the above-mentioned media conversion, or contents of the media change request. When the designation of the resultant media type of the media conversion is obtained, then, in Step 108, an instruction of the media conversion into the designated resultant media type is given to the server or the PBX 57 that has issued the connection destination inquiry request. When the contents of the media change request are obtained, an instruction of processing the media change request is given. The contents of the media change will be described later.

As the response corresponding to the contents of the customer's request, which is informed of in answer to the inquiry to the rule application module 83 in Step 103, there is obtained designation of processing such as, for example, designation of a process for sending a given message to the computer of the operator of the connection destination of the call. In Step 109, the designated processing is carried out.

The connection destination decision module 81 is a resident program.

Figure 15:
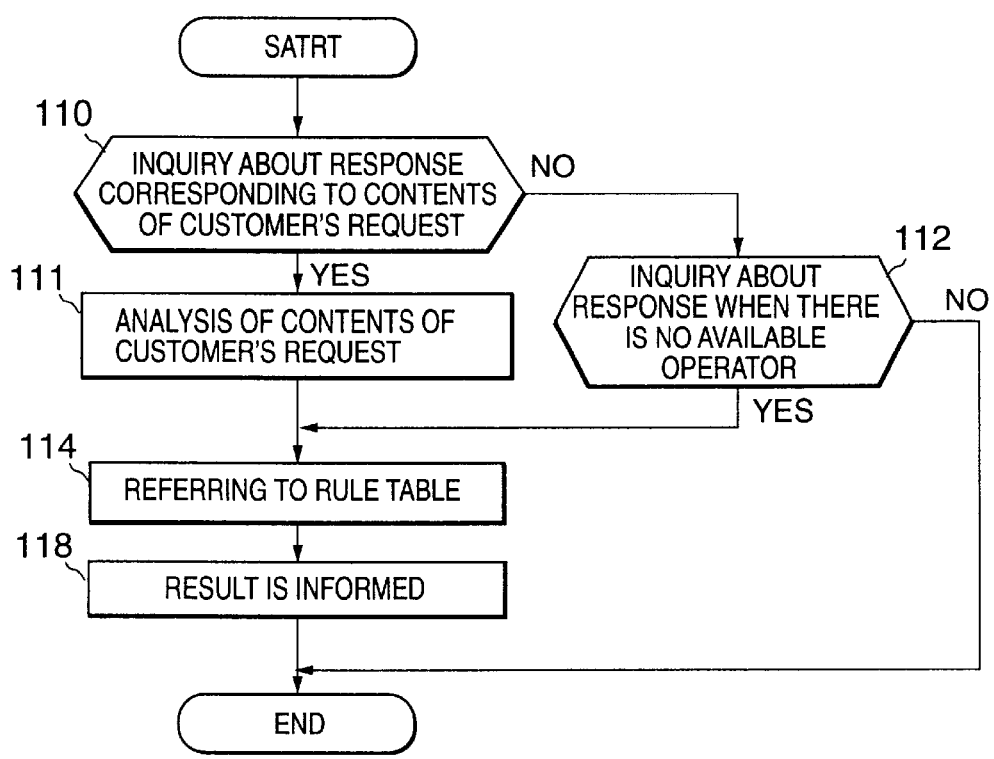
FIG. 15 is a flowchart showing a process carried out by a rule application module according to an embodiment of the present invention.

As shown in FIG. 15, when the rule application module 83 receives an inquiry about a response corresponding to contents of a customer's request, from the connection destination decision module 81 (Step 110), then, the rule application module 83 first analyzes the contents of the customer's request (Step 111).

For analyzing the contents of the customer's request, the server or the PBX 57, which is responsible for connection of a call of the media for which contents of a customer's request is analyzed, receives the customer's request before issuing a connection destination inquiry request.

For example, in a case where a call connection request is generated since a call arrives in the PBX 57 from a customer's telephone, then, first, the customer's call is connected to IVR (Interactive Voice Response) added to the PBX 57, at the time when the call arrives in the PBX 57. Thus, contents of the customer's request are obtained as a result of customer's response to leading questions asked by the IVR. The PBX 57 sends the multimedia ACD server 55 the obtained contents of the customer's request together with the connection destination inquiry request. Then, depending on the contents of the reply from the multimedia ACD server 55 to the connection destination inquiry request, connection of the customer's call is changed.

In a case where a call connection request arises since the WEB server 61 gives notice of an Internet telephony connection request from a customer, a customer's request is received in the WEB page shown in FIG. 2 or 3, together with the above-mentioned contact request. The customer's request is received by the WEB server 61 together with the notice of the Internet telephony connection request from the customer, and the WEB server 61 sends the notified contents of the customer's request to the multimedia ACD server 55 together with the connection destination inquiry request.

In a case where a call connection request is generated since a call arrives in the PBX 57 from a customer's facsimile, then, first, the customer's call is connected to a facsimile server added to the PBX 57, at the time when the call arrives in the PBX 57. Thus, the facsimile server receives the facsimile. After converting the contents of the received facsimile into characters, the facsimile server analyzes the converted characters to obtain the contents of the customer's request. Then, the PBX 57 sends the received contents of the customer's request to the multimedia ACD server 55, together with a connection destination inquiry request. Then, depending on the contents of the reply from the multimedia ACD server 55 to the connection destination inquiry request, the facsimile server sends a facsimile.

When, in reply to a call connection destination inquiry request, the PBX 57 is instructed by the multimedia ACD server 55 to carry out media conversion into voice mail or Fax mail, then, the PBX 57 connects the call to the unified messaging server 59, and, at the same time, transfers the obtained contents of the customer's request to the unified messaging server 59.

In the IP telephony server 58, contents of a customer's request are processed similarly to the PBX 57.

With regard to voice mail or Fax mail, the unified messaging server 59 sends the multimedia ACD server 55 contents of a customer's request transferred from the IP telephony server or the PBX, together with the connection destination inquiry request. With regard to E-mail, the unified messaging server sends the multimedia ACD server 55 contents of a customer's request that are obtained by performing natural language processing on the original E-mail text and analyzing it based on frequencies of key words appearing in the original text, together with the connection destination inquiry request.

Returning to FIG. 15, when the analysis of the contents of the customer's request is finished, the rule table 84 is searched with respect to the result of the analysis and the media type of the call, to obtain a response corresponding to the contents of the customer's request. The obtained response is returned to the connection destination decision module 81 (Step 118).

For example, as shown in the rule table of FIG. 12, in a case where the contents of a customer's request requires immediacy, a process of sending a message that informs the operator's computer 64 decided as the connection destination of the call about an arrival of each of various mail or facsimile is designated as a response registered in the rule table 84 correspondingly to the customer's request. Or, in a case where a customer's request requires detailed explanation, a process of sending a message that indicates operations to be performed by the operator is designated. When designation of a process is obtained as a response corresponding to the contents of the customer's request, the connection destination decision module 81 performs that process.

In a case where the rule application module 83 receives an inquiry from the connection destination decision module 81 about a response to be made when a call connection destination does not exist (Step 112), the rule table 84 is searched with respect to the media type of the call to obtain the response to be made when a call connection destination does not exist. The obtained response is returned to the connection destination decision module 81 (Step 118).

For example, as shown in the rule table of FIG. 12, contents of media conversions such as conversion of a telephone call into voice mail, a facsimile call into Fax mail, etc. and the contents of the above-mentioned media change request are registered in the rule table 84 as the responses to be made when a call connection destination does not exist.

Examples of the ways of responding will be mentioned in the following.

When a face-to-face type conversation using a dynamic image in CSCW or the like is requested and there does not exist an operator who can respond to that request, then, CSCW (including a telephone) without using a dynamic image is employed to respond.

When a conversation on the telephone through WEB is requested and there does not exist an idle telephone line (through PBX), then, a text-base conversation (chat) on WEB or instant messaging is employed to respond.

When a real-time conversation on the telephone, CSCW, or chat is requested, and all the operators who can respond to such a request are involved in conversations with other customers, then, the response is switched to a stored-type message such as E-mail or facsimile. Namely, a real-time response is switched to a delayed response. Although it is a delayed response, the requested contents can be informed of on the spot, from the viewpoint of the customer.

When a method of response is to be changed, there is a method in which a customer is requested to change media, or a method in which media conversion is performed within the system of the present invention to adapt to various media. In constructing a system, either method may be selected. In the case that the adaptation to the media is carried out within the system, customers may be informed to that effect. The media change request means to send a customer a message requesting change of a media type. As the contents of media change requests, the rule table 84 registers which media type is requested as the media type to be utilized for contact.

When the connection destination decision module 81 receives a request for processing media change as a response at the time of nonexistence of the call connection destination, then, the connection destination decision module 81 sends an instruction to perform processing of the media change request in accordance with the contents of the received request, together with designation of the media type to which the media type utilized for contact is changed, to the server or the PBX 57 that has issued the call connection destination inquiry request. The server or the PBX 57 connects the call, on which the call connection destination inquiry has been issued, to a functional part that is added to the server or the PBX 57 and can sends a message through the media type of that call. Then, from this functional part, there is sent a message requesting the change of the media type used for contact into the media type designated by the connection destination decision module 81.

Or, the following procedure may be employed. Namely, when a call connection request is generated by WEB server's notice of an Internet telephony connection request from a customer, then, the server or the PBX 57 that has issued the call connection destination inquiry transfers an instruction to perform processing of the media change request to the WEB server 61. Then, the WEB server 61 outputs a message requesting a change of the media type utilized for contact into the designated media type, onto the WEB page, shown in FIG. 2 or 3, of a computer of the customer who has issued the contact request.

Detailed methods of requesting the media change will be described.

(1) When a customer issues a request of (IP (Internet)) telephone conversation (through WEB) for example by pushing "Call back" or "Call Me" button in a WEB screen (browser screen):

An response message is returned to the browser in answer to the conversation request issued through the WEB screen. For example, the following messages:

(a) All the operators are busy;
(b) Please send the contents of the inquiry via E-mail (or the like);
(c) If necessary (if designated by the customer), the answer will be given by return telephone;

and the like are returned to the customer's side browser in the HTML document format, so that the browser gives the notice by displaying the messages.

In that case, a document inputting (sending) mechanism in a form format may be prepared within the HTML document to be returned, to prompt sending of the form of the inquiry contents. The inquiry sent in the form can be received as mail on the operator's side, by transferring/loading it into a queue of mail (E-mail) on the WEB server's side.

In other words, with respect to a request received through WEB, a response message to the request is returned to the browser.

(2) When CSCW is requested:

A response to a connection request utilizing WEB base CSCW is similar to the case of the request through WEB described in the above (1).

When a specific application is used, a condition code is returned to that application, and that application on the customer's side interprets the condition code to give a message corresponding to that code.

(3) When a request uses means classified as a unified type, such as E-mail:

Contents of the request is interpreted on the server's side, and when it is judged that a direct conversation is required, an automatic response is returned through E-mail. In the E-mail (mail document), a direct telephone number of a department in charge and a specific inquiry number are informed of. When the customer makes a telephone call using the informed number, and inputs the given inquiry number being lead by IVR (automatic arrangement for responding), then, the customer can have a conversation with an operator (expert) of the department in charge to which the inquiry mail sent before is transferred.

In the above-described CTI system, the sharing of the roles in the processing between the multimedia ACD server 53 and other servers or the PBX 57 is one example, and may be modified suitably depending on conditions or environment to which the present embodiment is applied.

In the above embodiment, instead of the IP telephony server 58, there may be employed a device that simply converts a call from a customer's Internet telephone into a telephone call that can be processed by the PBX 57, and inputs/outputs the converted call into and from the PBX 57.

The above-described embodiments are mere examples, and may be modified suitably. For example, with regard to the media conversion, when it is desirable to connect a call to an operator who can use a telephone but not an Internet telephone, then an Internet telephony call may be subjected to media conversion to convert it to a telephone call. Or, the unified messaging server 59 may directly receive Fax mail and voice mail from a customer or an operator, to convert them suitably into a facsimile or telephone call, or may convert E-mail into voice to convert it into a telephone call.

In a case where the CTI system carries out an escalation process in which a call from a customer is transferred from an operator to an expert in charge, an expert in charge, who is not using a call for real-time communication, may be decided as the destination of the transfer, similarly to the case that an operator is decided as the destination of connection.

In the above-described embodiments, as the response corresponding to contents of a customer's request, media conversion may be performed depending on the result of the analysis of the customer's request. For example, a telephone call from a customer who does not require immediacy may be converted into voice mail. Similarly, the media change request may be given depending on a media type and contents of a customer's request. As the response to be made when a call connection destination does not exist, media conversion may be carried out depending on the result of the analysis of the customer's request, or a media change request may be made depending on the result of the analysis of the customer's request.

The connection destination of a call may be decided depending on a type of media and contents of the analysis of a customer's request. As the response to be made when a call connection destination does not exist, a response of sending a given message or other response may be made. For example, a message indicating that a contact with a customer through a given media type should be made in return may be sent to a suitable operator, and, a message indicating that an operator will have a contact in return may be sent to the customer.

According to the present embodiments, it is possible to prevent a multimedia ACD server from assigning a plurality of calls, which perform real-time communication, to the same operator at the same time.

Even when there does not exist an operator to whom a call from a customer can be connected, it is possible to make a response without degrading service quality for customers, for example, by carrying out media conversion to receive a customer's request as mail, or by requesting a customer to change the media type used for contact.

Respective programs of the servers, the PBX, the operators'computers, and the multimedia ACD server, referred to in the above embodiments, may be provided being stored in a storage medium such as a CD-ROM. Similarly, they may be provided through a communication line.

As described above, the present invention provides the CTI system that is adapted for plural types of media, and can appropriately distribute calls to respective operators.

According to the present invention, it is possible to provide the CTI system that adapted for various types of media and can respond to a call without degrading the service quality for customers, even when there arises a call connection request from a customer, and there does not exist an operator who can respond to the call of the media type in question.

While the present invention has been described in detail and pictorially in the accompanying drawings, it is not limited to such details since many changes and modifications recognizable to those of ordinary skill in the art may be made to the invention without departing from the spirit and the scope thereof.

What is claimed is:

1. A multimedia call distribution system comprising:
    a plurality of call connection devices that connect calls of respective types of media different from one another;
    a multimedia call distribution device; and
    a plurality of terminal devices that can perform communication by calls of plural different types of media, wherein:
        each of said call connection devices comprises:
            an inquiry means that issues an inquiry to said multimedia call distribution device about a terminal device to which a call is to be connected, when a call connection request is received, and
            a connection means for connecting the call to the terminal device informed as a response to said inquiry, by said multimedia call distribution device; and
        said multimedia call distribution device comprises:
            a monitoring means for monitoring communication conditions of each terminal, device about respective types of media, and
            a connection destination deciding means for selecting one terminal device that can at least perform real-time communication, when said inquiry is received from said call connection device and when a type of media of a call connected by the call connection device that has issued the inquiry is a type of media that at least preforms real-time communication, said connection destination deciding means informing the call connection device that has issued inquiry, of the selected terminal device as a response to said inquiry.

2. The multimedia call distribution system according to claim 1, wherein:
    said system comprising:
        receiving means that, when said call connection device receives a call connection request, receives contents demanded in communication of the call realized by said call connection request, from a source of sending said call connection request; and
        media conversion means for sending received contents of communication to a terminal device through a call of a different type of media from a type of media of the call for which the inquiry has been issued, wherein:
            said receiving means connects itself to the call for which the inquiry has been issued, to receive the contents of the communication by said call, when said connection destination deciding means can not select a terminal device since there does not exist a terminal device that can at least perform real-time communication.

3. The multimedia call distribution system according to claim 2, wherein:
    said different type of media from the type of media of the call for which the inquiry has been issued is a type of media that at least performs non-real-time communication.

4. The multimedia call distribution system according to claim 1, comprising:

media change requesting means for requesting a source that has sent said call connection request for which the inquiry has been issued to send a call of a different type of media, when said connection destination deciding means can not select a terminal device since there does not exist a terminal device that can at least perform real-time communication; and means for requesting another call connection device that can communicate through said different type of media, to process a media change request, accompanying said notice.

5. A multimedia call distribution device used in a multimedia call distribution system, said system comprising a plurality of call connection device that connect calls of respective types of media different from one another, and a plurality of terminal devices that can perform communication by calls of plural different types of media, and said multimedia call distribution device comprising:

means for receiving an inquiry about a terminal device to which a call is to be connected, said inquiry being issued by each of said call connection devices upon receiving a call connection request;

monitoring means for monitoring communication conditions of each of said terminal devices about respective types of media, and connection destination deciding means for selecting one terminal device that can at least perform real-time communication, as a terminal device that is connected with the call by said call connection device when a type of media of the call that is connected by said call connection device is a type of media that at least performs real-time communication, said connection destination deciding means informing the call connection device that has issued said inquiry, of the selected terminal device as a response to said inquiry.

6. The multimedia call distribution device according to claim 5, wherein:

said multimedia call distribution device comprises means for requiring said call connection device to make a media change request to a source of sending the call connection request for sending a call, through a different type of media, when said connection destination deciding means can not select a terminal device since there does not exist a terminal device that can perform real-time communication.

7. A call connection device used in a multimedia call distribution system in which a multimedia call distribution device distributes connections of calls of respective types of media different from one another into a plurality of terminal devices that can perform communication through plural different types of media, said call connection device comprising:

inquiry means that issues an inquiry to said multimedia call distribution device about a terminal device to which a call is to be connected when a call connection request is received, and connection means for connecting the call to the terminal device that is informed as a response to said inquiry, by said multimedia call distribution device.

8. The call connection device according to claim 7, comprising:

receiving means that, when a call connection request is received, receives contents demanded in communication of the call realized by said call connection request, from a source of sending said call connection request; and media conversion means for sending contents of received communication to a terminal device by a call of a different type of media different from a type of media of the call for which the inquiry has been issued; wherein:

said receiving means connects itself to the call for which the inquiry has been issued, to receive the contents of the communication by said call, when there does not exist a terminal device that can at least perform real-time communication.

9. The call connection device according to claim 7, comprising:

means for informing a source that has sent the call connection request for which the inquiry has been issued, about a media change request to said source for sending a call, of a different type of media, when said connection destination deciding means can not select a terminal device since there does not exist a terminal device that can at least perform real-time communication; and means for requesting another call connection device that can communicate through said different type of media, to process the media change request, accompanying said notice.

10. A storage medium in which a program to be read and executed by a computer is stored, wherein:

said program carries out following steps in a multimedia call distribution system comprising a plurality of call connection devices that connect calls of respective types of media different from one another, a multimedia call distribution device, and a plurality of terminal devices that can perform communication by calls of plural different types of media; namely, the steps of:

making each of said call connection devices:

issue an inquiry to said multimedia call distribution device about a terminal device to which a call is to be connected when a connection request, for the call is received, and connect the call to the terminal device that is informed as a response to said inquiry, by said multimedia call distribution device; and making said multimedia call distribution device:

monitor respective communication conditions of each of said terminal devices about the types of media, select one of terminal devices that are not involved at least in communication of a type of media that performs real-time communication, when said multimedia call distribution device receives said inquiry from said call, connection device, and when the type of media of the call to be connected by the call connection device that has issued the inquiry is a type of media that performs at least real-time communication, and inform said call connection device that has issued the inquiry, of the selected terminal device as a response to said inquiry.

11. The storage medium that stores a program to be read and executed by a computer, according to claim 10, wherein:

said program makes said call connection device carry out the steps of:

sending received contents of communication to a terminal device by a call of a different type of media different from a type of media of the call for which the inquiry has been issued; and connecting to the call for which said request has arrived, and receiving contents of communication by said call, when said one terminal device can not be selected since there does not exist a terminal device that can at least perform real-time communication, with respect to said call connection request.

12. The storage medium that stores a program to be read and executed by a computer according to claim 11, wherein:
said different type of media different from the type of media of the call for which the inquiry has been issued means a type of media that performs at least non-real-time communication.

13. The storage medium that stores a program to be read and executed by a computer, according to claim 10, wherein:
said program makes said call connection device carry out the steps of:
making a media change request to a source that has sent the call connection request for which the inquiry has issued, for sending a call of a different type of media, when said one terminal can not be selected since there does not exist a terminal device that can perform at least real-time communication, and
requesting another call connection device that can communicate through said different type of media, to process the media change request, accompanying the notice of said media change request.

14. A storage medium that stores a program to be read and executed by a computer, wherein:
said program makes following steps be carried out by a multimedia call distribution device used in a multimedia call distribution system comprising a plurality of call connection devices that connect calls of respective types of media different from one another, and a plurality of terminal devices that can perform communication by calls of plural, different types of media; namely, the steps of:
receiving an inquiry about a terminal device to which a call is to be connected, when each of said call connection devices receives a connection request for the call and issues said inquiry; and
with respect to each terminal device,
monitoring communication conditions of said terminal device about respective media types,
selecting one of terminal devices that can at least perform real-time communication, as the terminal device to which said call, connection device is to connect the call, when a type of media of the call to be connected by said call connection device is a type of media that perform at least real-time communication, and
informing the call connection device that has issued said inquiry of said selected terminal device as a response to said inquiry.

15. The storage medium that stores a program to be read and executed by a computer, according to claim 14, wherein:
said program makes the multimedia call distribution device carry out a step of:
requesting said call connection device to make a media change request to a source that has sent the connection request of the call for which the inquiry has issued, for sending a call of a different media type, when no terminal device can be selected since there does not exist a terminal device that can perform real-time communication.

16. A storage medium that stores a program to be read and executed by a computer, wherein:
said program makes following steps be carried out by a call connection device used in a multimedia call distribution System in which a multimedia call distribution device distributes calls of respective types of media different from one another into a plurality of terminal devices that can perform communication by calls of plural different types of media; namely, the steps of:
issuing an inquiry about a terminal device to which a call is to be connected when a connection request for the call is received; and
making the call be connected by the terminal devices informed as a response to said inquiry, by said multimedia call distribution device.

17. The storage medium that stores a program to be read and executed by a computer, according to claim 16, wherein:
said program makes said call connection device carry out the steps of:
sending received contents of communication to a terminal device by a call of a different type of media different from a type of media of the call for which the inquiry has been issued; and
connecting to the call for which said inquiry has issued, to receive contents of communication by said call, when no terminal device can be selected since there does not exist a terminal device that can at least perform real-time communication, with respect to said call connection request.

18. The storage medium that stores a program to be read and executed by a computer, according to claim 16, wherein:
said program makes said call connection device carry out the steps of:
making a media change request to a. source that has sent the call connection request for which the inquiry has issued for sending a call of a different type of media, when no terminal device can be selected since there does not exist a terminal device that can at least perform real-time communication; and
requesting another call connection device that can communicate through said different type of media, to process the media change request, accompanying said media change request.

* * * * *